United States Patent [19]

Shiverdecker

[11] 4,063,983
[45] Dec. 20, 1977

[54] ORBITAL HEAT SEALING APPARATUS AND METHOD

[75] Inventor: James H. Shiverdecker, Dayton, Ohio

[73] Assignee: Bergstein Packaging Trust, Middletown, Ohio

[21] Appl. No.: 623,638

[22] Filed: Oct. 20, 1975

[51] Int. Cl.² ............ B31B 1/64; B32B 31/20; B65B 51/10
[52] U.S. Cl. ...................... 156/306; 53/39; 53/373; 93/27; 93/DIG. 1; 156/583
[58] Field of Search ............ 156/583, 582, 555, 306; 93/27, DIG. 1, 33 H; 53/39, 373, DIG. 2; 100/154; 144/281 B

[56] References Cited

U.S. PATENT DOCUMENTS

| | | | |
|---|---|---|---|
| 2,492,530 | 12/1949 | Kriegsheim | 93/DIG. 1 |
| 3,195,286 | 7/1965 | Hubin | 156/583 |
| 3,453,801 | 7/1969 | Stohlquist | 156/583 |
| 3,560,312 | 2/1971 | Smith | 156/583 |
| 3,577,304 | 5/1971 | Guyer | 156/555 |
| 3,850,213 | 11/1974 | Keaton | 100/154 |

*Primary Examiner*—Charles E. Van Horn
*Assistant Examiner*—M. G. Wityshyn
*Attorney, Agent, or Firm*—Melville, Strasser, Foster & Hoffman

[57] ABSTRACT

Apparatus and method for heat sealing a moving tubular liner or the like wherein the area of the liner to be sealed is repeatedly contacted by an opposing pair of elongated sealing elements mounted for movement in orbital paths relative to each other and to the liner passing therebetween.

10 Claims, 7 Drawing Figures

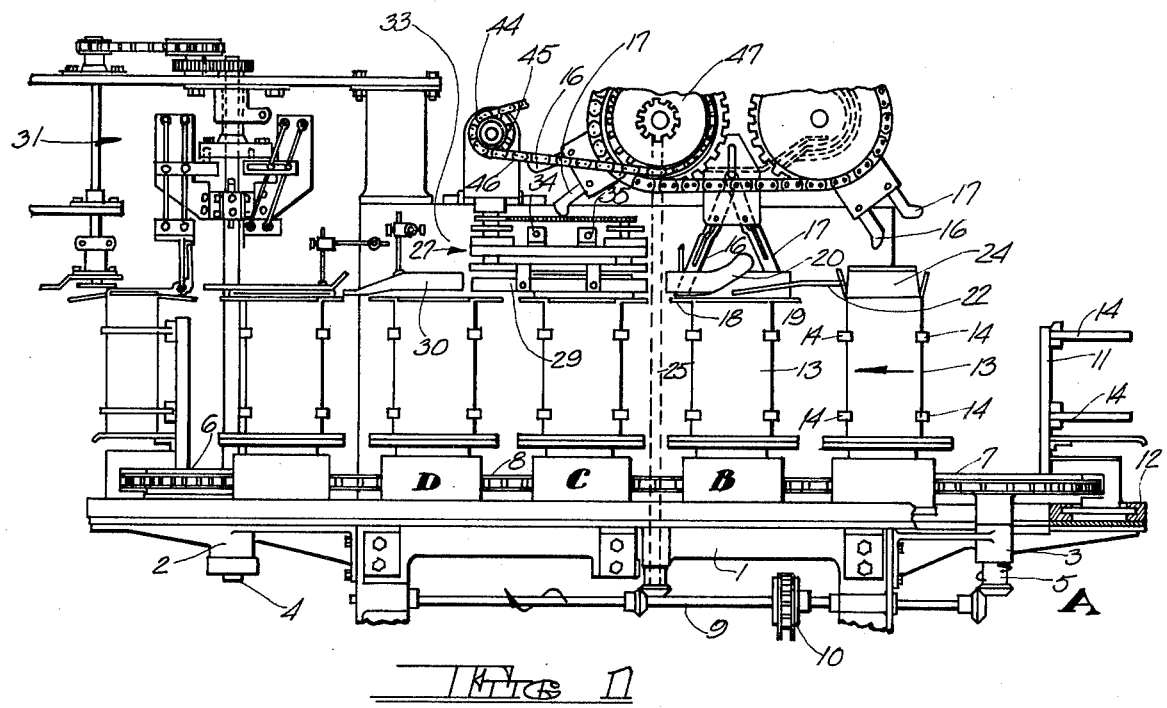
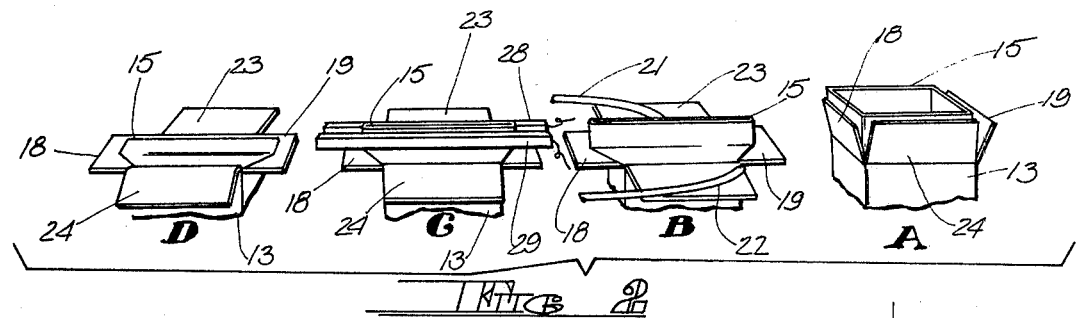
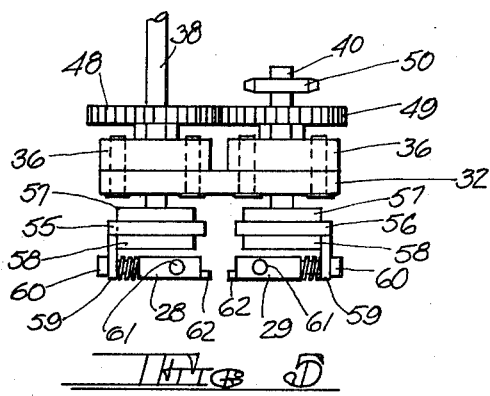

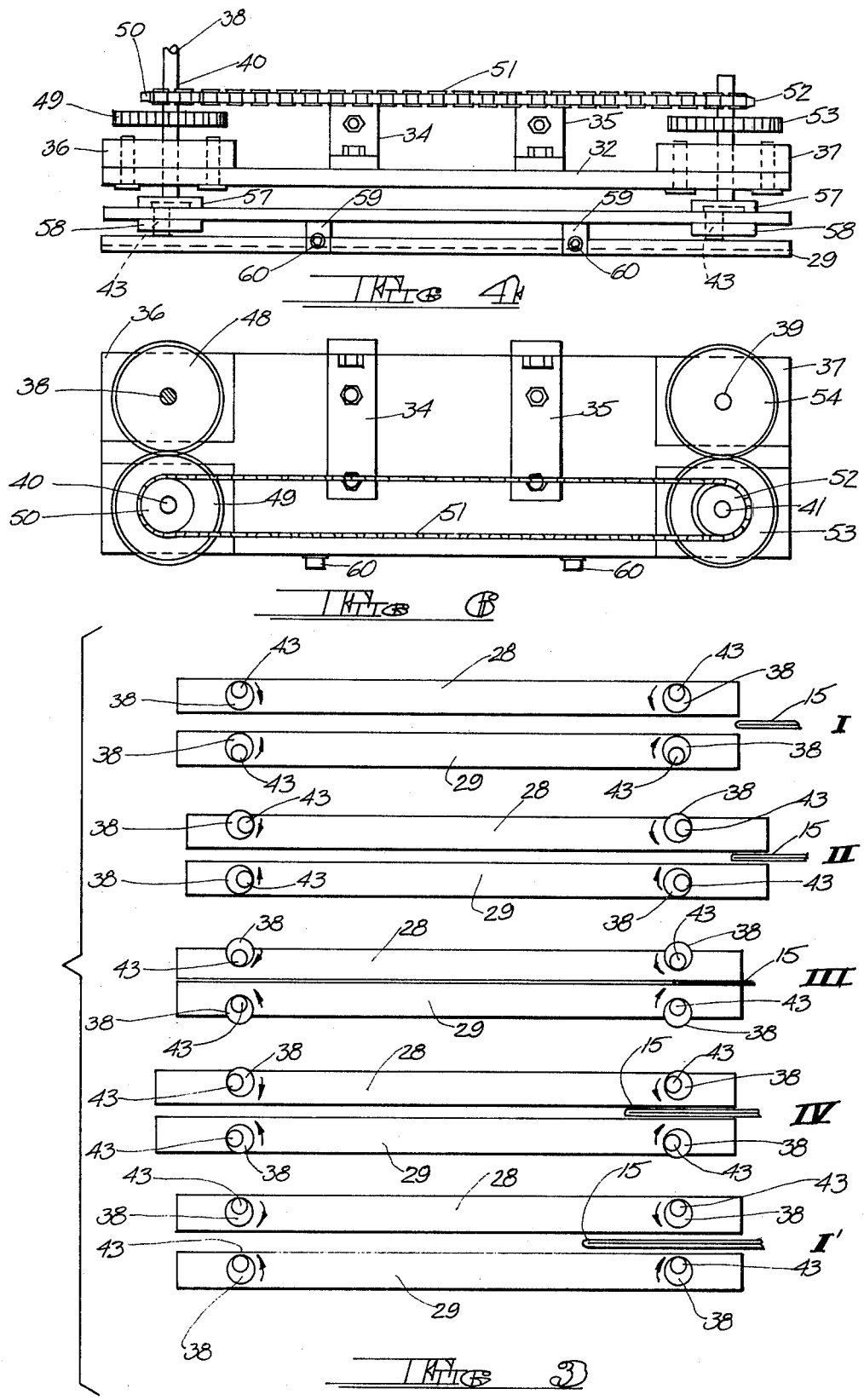

ORBITAL HEAT SEALING APPARATUS AND METHOD

BACKGROUND OF THE INVENTION

This invention relates to packaging apparatus, and more specifically to apparatus and procedures for heat sealing packaging materials, such as liners and bags having tubular mouths which must be closed and sealed. While the invention may be utilized to seal the mouths of diverse types of liners and bags, it will find particular utility in the sealing of lined cartons which, upon erection, are continuously advanced in a path of travel during which the mouths of the extended liners are sealed and infolded, followed by the infolding and sealing of the carton end closure flaps.

Numerous expedients have been heretofore employed to seal the mouths of the liners, depending upon the nature of the liner materials and their heat sealing characteristics. If the nature of the lining material is such that it may be directly contacted by the sealing elements, these expedients have included the use of heated metallic belts which travel with the lining material until the desired seal is effected, and also the use of traveling sets of jaws which engage the liner and move with it until sealing is effected, whereupon the jaws open and are returned for engagement with a succeeding liner. Other heat sealers have utilized radient heat or hot air to at least partially heat the liners in the areas to be sealed, followed by pressure rollers which compress the heated material to complete the seal.

A major disadvantage common to the foregoing types of heat sealing apparatus is the amount of space required to perform the heat sealing operation when the liners are being continuously advanced in a path of travel as an incident of the various filling, closing and sealing operations which must be performed. This is particularly true if the cartons and liners are running at a relatively high rate of speed. Effective sealing is a function of time, it being necessary to heat the liner material to sealing temperature and compress the material together to obtain the desired seal; and as the speed of travel increases, so does the amount of space required to maintain heating and sealing contact for the amount of time required to effect the desired seal. Since space is often at a premium, the problem becomes acute.

The present invention overcomes the foregoing difficulties by utilizing a sealing technique wherein the advancing liners are repeatedly contacted by an opposing pair of heating elements which move in orbital paths relative to each other and to the advancing liners. With such arrangement, the total time in which the sealing elements are in contact with each liner is sufficient to form the seal, yet due to their orbital movement during which the sealing elements repeatedly close against the liner, advance a short distance with it, open, and then retract for reclosing and reengagement with the same liner, the amount of spece required for the sealing operation is minimized.

SUMMARY OF THE INVENTION

In accordance with the invention, the mouths of the liners or bags to be sealed are continuously advanced between an opposing pair of heating elements comprising elongated bars which are mounted for movement in orbital paths; that is, the heating bars are mounted so as to move toward and away from each other and, at the same time, advance and retract with respect to the path of travel of the liners. During each orbit, the heating bars move from a fully open to a fully closed position and return in a direction at right angles to the path of travel of the liners, and they also move from a fully retracted to a fully advanced position with respect to the direction of travel of the liners. The heating bars advance with the liners as they move inwardly from midway between their fully open and fully closed positions, and continue to advance until they have moved to a point midway between their fully closed and fully open position. The heating bars retract relative to the path of travel of liners as they move from the midway point to the fully open position, the retracting movement continuing until they have returned to the midpoint of closing movement. Thus, the sealing bars travel with, engage and release the liners during one-half of each orbit or cycle of operation, and retract or move in a direction opposite to the direction of travel of the liners during the other half of each orbit.

The heating bars, which are preferably electrically heated, are each mounted on a base plate by spring biasing means which permit relative adjustments of the heating bars and the pressure exerted by the bars on the interposed liners as the bars come together. The base plates are mounted on drive shafts having eccentric lower portions which effect orbital movement of the heating bars and base plates and also serve to suspend each heating bar-base plate assembly from an overlying mounting block. The upper ends of the drive shafts are interconnected by gear means, including chain and sprocket drive means for movement in unison, and one of the drive shafts is also operatively connected to a source of power, which may comprise the driving means for other components of the carton filling and sealing apparatus with which the sealing means is associated, including the conveyor means for advancing the liners in the desired path of travel. With such arrangement, the orbital movement of the sealing bars may be readily timed in accordance with the speed of travel of the liners.

In its method aspects, the invention contemplates the repeated contact of the sealing bars with each successive liner, with as many as 10 to 15 contacting movements of the sealing bars as each liner traverses the length of the bars. The line of seal, which is essentially a straight line, is formed in increments lying in prolongation of each other; that is, as the leading edge of the liner passes between the leading ends of the sealing bars, the first closing movement of the sealing bars may only contact the first inch or so of the liner and hence form only a small leading part of the seal. The next orbital movement of the sealing bars to the closed position engages not only the previously contacted leading portion of the liner but also a succeeding portion, which may comprise another inch or so along the front to rear length of the liner. Succeeding orbits of the sealing bars contact additional increments of the liner until the liner lies wholly within the confines of the sealing bars, at which point the sealing bars contact the full front to rear length of the liner, whereupon as the liner advances beyond the sealing bars, only the trailing portions of the liner are contacted during successive orbits of the heating bars. In net effect, each portion of the liner is contacted by the heating bars for as many as ten to fifteen times, thereby producing sufficient heat and pressure to fuse together the opposite sides of the liner as if it has been continuously held between the heating bars for the length of time necessary to complete the seal.

Heat sealing in accordance with the invention may be conducted at relatively high speeds and yet within a very limited area. For example, in an exemplary installation on a rotary-type packaging machine for closing and sealing lined cartons, utilizing sealing bars which are 15 inches long, less then 16 inches is required to accommodate the entire sealing unit since orbital movement of the sealing bars need be only about ¾ inch as between the fully extended and fully retracted positions of the bars. Effectively, the bars will be traveling at the same lineal speed as the liners, and by synchronizing the drive means for the sealing bars with the other operating components of the packaging apparatus, including the conveying means for the liners, it will be evident that the number of orbits of the sealing bars will increase or decrease in direct relation to increases and decreases in the speed of travel of the liners.

DESCRIPTION OF THE DRAWINGS

FIG. 1 is a partial side elevational view of container closing and sealing apparatus, including liner sealing means in accordance with the invention, but with parts broken away and others in section to better illustrate the features of the invention.

FIG. 2 is a schematic fragmentary perspective view illustrating successive stages in the operation of the apparatus illustrated in FIG. 1.

FIG. 3 is a diagrammatic illustration of successive stages in the orbital movement of the sealing bars during each operating cycle.

FIG. 4 is an enlarged side elevational view of the liner sealing means.

FIG. 5 is an end elevational view of the sealing means taken from the left end of FIG. 4.

FIG. 6 is a plan view of the sealing apparatus shown in FIG. 4.

FIG. 7 is an enlarged side elevational view of one of the eccentric drive shafts for effecting orbital movement of the sealing bars.

DESCRIPTION OF THE PREFERRED EMBODIMENT

Referring first to FIG. 1 of the drawings which illustrates exemplary carton closing and sealing apparatus with which the present sealing mechanism may be used, the apparatus comprises a frame 1 mounting toward its opposite ends a pair of bearings 2 and 3 for vertically disposed shafts 4 and 5 which mount horizontally disposed sprockets 6 and 7 about which an endless conveyor chain 8 operates in a horizontally disposed flight. Driving power is supplied to the sprocket 7 through suitable gearing from drive shaft 9 which is operatively connected by driving gear 10 to any suitable source of power (not shown). The chain 8 carries a series of carriage members 11 which are guided in spaced apart relation about the conveyor path by channel guide members 12 which define the periphery of the apparatus.

The carriage members 11 are each adapted to receive and convey a container 13 which will be presented to the carriage at one end of the machine, as at station A shown in FIG. 1. The containers will be presented to the carriage in upright position with the top closure flaps and the liner projecting upwardly in the manner illustrated at A in FIG. 2. Each carriage is provided with coacting pairs of locking arms 14 which, upon presentation of a container to the carriage, engage the container body walls and secure it to the carriage.

As each container 13 is advanced by its carriage, the upstanding mouth of the liner 15 will be contacted by a spreading device comprising a pair of fingers 16 and 17 which enter the mouth of the liner and bring it to the flattened and elongated position seen at position B in FIGS. 1 and 2. In addition to elongating or spreading the liner, the fingers also serve to outfold the leading and trailing end closure flaps 18 and 19 which are engaged and maintained in their outfolded position by means of a holddown bar 20, seen in FIG. 1. Simultaneous with the action of the fingers 16 and 17, a pair of sweeps 21 and 22, best seen in FIG. 2, engage and outfold the remaining end closure flaps 23 and 24 of each carton, thereby exposing the flattened and elongated mouth of the liner 15. It may be noted that the sets of fingers which spread and elongate the mouths of the liners may be driven in timed relation to the movement of the carriages 11 by means of drive shaft 25, seen in FIG. 1, which is driven from the main drive shaft 9.

As the fingers 16 and 17 are withdrawn from the elongated and flattened mouth of each liner 15, the liner passes into the liner sealing means, indicated generally at 27, which includes the heating bars 28 and 29, diagrammatically illustrated at "C" in FIG. 2, the sealing bars serving to seal together the juxtaposed and flattened walls of the liner in the manner which will be hereinafter described in detail.

Upon passage of the sealed end of the liner mouth 15 beyond the sealing means 27, the sealed end of the liner is contacted by a sweep 30 which folds over the end of the liner, the container thus assuming the condition illustraged at "D" in FIG. 2. Thereafter, as the end closure flaps are acted upon by various flap folding means, indicated generally at 31, which form no part of the present invention. Details with respect to the carton folding and gluing apparatus just described, with the exception of the liner sealing means, can be found in Bergstein et al. U.S. Pat. No. 2,979,995, issued Apr. 18, 1961. It is to be understood, however, that the carton closing and sealing apparatus as such does not constitute a limitation upon the present invention, the illustrated apparatus merely being indicative of the environment in which the present invention may be utilized.

Referring next to FIGS. 4, 5 and 6, the sealing unit comprises a mounting block 32 adapted to be secured to the upper frame portion 33 of the apparatus (seen in FIG. 1) by means of mounting brackets 34 and 35. Seats 36 and 37 are secured to the opposite ends of the mounting blocks, the seats and mounting block being bored and bushed to rotatably mount sets of drive shafts 38, 39 and 40, 41. As best seen in FIG. 7, each of the drive shafts, such as the illustrated drive shaft 38, terminates at its lowermost end in an enlarged disc portion 42 which mounts the depending eccentric shaft portion 43.

The upper end of the drive shaft 38 is operatively connected to gear box 44, seen in FIG. 1, which is connected by sprocket 45 and chain 46 to a sprocket 47 operatively connected to drive shaft 25 which also drives the sets of spreading fingers 16 and 17. With this arrangement, the drive shaft 38 is driven in timed relation to the other operating components of the apparatus, including the carriages 11 which convey the lined cartons through the sealing unit.

Referring again to FIGS. 4, 5 and 6, the drive shaft 38 mounts a gear 48 which meshes with a gear 49 mounted on drive shaft 40. Drive shaft 40 additionally mounts a sprocket 50 connected by drive chain 51 to sprocket 52 mounted on drive shaft 41. Drive shaft 41 also mounts gear 53 which is in meshing engagement with gear 54 mounted on drive shaft 39. With this arrangement, all of the drive shafts are driven in unison from shaft 38 which, as previously indicated, is driven in timed relation to the movement of the carriages 11 which convey the lined cartons.

The lowermost portion of each drive shaft, including the disc portion 42 and eccentric shaft portions 43, projects downwardly from the undersurface of mounting block 32. The lowermost ends of drive shafts 38 and 39 engage the base plate 55; similarly, a corresponding base plate 56 is engaged by the lowermost ends of drive shafts 40 and 41. Sets of fittings 57 and 58 rotatably mount the lower ends of the drive shafts, including the disc portions 42 and eccentric shaft portions 43, to the base plates 55 and 56, the base plates being thereby suspended on the lowermost ends of the drive shafts and mounted for orbital movement. It will be evident that as the drive shafts rotate about their centerlines, the eccentric shaft portions 43, the centerlines of which are offset laterally with respect to the centerlines of the shafts (see FIG. 7), will move in an orbital path about the centerlines of the shafts, thereby imparting orbital movement to the base plates.

The heating bars 28 and 29 are suspended from the base plates 55 and 56, respectively, by sets of brackets 59 to which the heating bars are adjustably attached by spring-biased adjustment means 60 which resiliently mount the heating bars relative to each other. The spring-biased adjustment means permit adjustment of the sealing pressure of the heating bars as they engage the liners and also permit lateral deflection of the heating bars relative to the base plates so that the bars may be positioned to make contact with each other and with the interposed liners prior to the parts reaching the fully closed position. Thus, the sealing bars may make contact with each other as the parts approach the fully closed position and maintain such contact until the parts have moved away from the fully closed position by a corresponding distance. It will be understood that the heating bars will be provided with suitable heating elements 61, as seen in FIG. 5, and it is also preferred to provide the heating bars with mating sealing lips 62 which define the line of seal being formed.

Reference is next made to FIG. 3 which diagrammatically illustrates the orbital movement of the sealing bars at successive stages during each orbit or cycle of operation. At stage I, the sealing bars are in the fully open position relative to each other and midway between their fully advanced and fully retracted positions relative to the path of travel of the liner 15, which is shown advancing toward the open sealing bars.

Stage II shows the bars midway between the fully open and fully closed position, and with the bars in their fully retracted position. The liner, which is continuously moving, has advanced to lie partially within the confines of the sealing bars.

At stage III the sealing bars have moved to the fully closed position and they are also advancing in clamping engagement with the liner, the sealing bars and liner effectively moving at the same ratio of lineal speed.

Stage IV illustrates the fully advanced position of the sealing bars which are also moving away from the fully closed position so as to release the liner.

As the sealing bars move beyond the position shown at IV, they begin to retract, i.e., move rearwardly as they move toward the fully open position, shown at I'. During this movement the bag will continue to advance between the now separated jaws but will be subsequently reengaged by the heating bars as the cycle is repeated. As will be evident from the illustrations, the liner will be repeatedly contacted by the heating bars and the seal progressively formed as the liner advances. Effectively, each portion of the liner will be contacted by the sealing bars for a total contact time which is sufficient to fully seal the liner throughout its full extent.

It will be understood that modifications may be made in the invention without departing from its spirit and purpose, and it is not intended that the the invention be limited other than in the manner set forth in the claims which follow.

The embodiments of the invention in which an exclusive property or privilege is claimed are defined as follows:

1. Apparatus for heat sealing a continuously moving tubular liner and the like wherein the opposite sides of the liner in the area to be sealed are repeatedly contacted by the same pair of heating elements to incrementally form a relatively narrow continuous line of seal, liner advancing means for continuously advancing the liner in a straight-line path of travel, an opposing pair of elongated sealing bars lying in face-to-face relation on opposite sides of the path of the liner, said sealing bars being positioned to contact the opposite sides of the liner only in the area thereof to be heat sealed, means mounting said sealing bars for movement relative to each other in orbital paths of travel in which the sealing bars during each orbital cycle advance and retract in the direction of their length as they concurrently move toward and away from each other while maintaining their face-to-face relationship, means for moving said sealing bars in unison in their orbital paths of travel, and means for driving said sealing bar moving means and said liner advancing means in timed relation such that the sealing bars will repeatedly move into and out of contact with the area of the liner being sealed as the liner advancing means advances the liner between the sealing bars, the sealing bars moving in the direction of the path of travel of the liner and at the same effective lineal rate of speed throughout the portion of each orbital cycle during which the sealing bars are in contact with the area of the liner being sealed.

2. The heat sealing apparatus claimed in claim 1 wherein the means mounting said sealing bars for orbital movement comprise opposing base plates on which said sealing bars are mounted, together with a plurality of drive shafts having eccentric shaft portions operatively connected to said base plates for moving said base plates and the sealing bars mounted thereon in said orbital paths of travel, and supporting means for said drive shafts.

3. The heat sealing apparatus claimed in claim 2 wherein the supporting means for said drive shafts comprise a mounting block from which said shafts depend, with said base plates suspended therebeneath, and wherein the means for moving said sealing bars in unison comprise gear means interconnecting said drive shafts for joint movement.

4. The heat sealing apparatus claimed in claim 3 wherein said sealing bars are mounted on said base plates by spring biased adjustment means which resiliently mount said sealing bars relative to said base plates.

5. The heat sealing apparatus claimed in claim 4 wherein drive shafts are mounted adjacent the opposite ends of each of said opposing base plates, wherein the gear means interconnect the drive shafts at each end of the opposing base plates and also interconnect the drive shafts at the opposite ends of one of said base plates, and shaft driving means operatively connected to one of said drive shafts, whereby all of said drive shafts are driven in unison by said shaft driving means.

6. The heat sealing apparatus claimed in claim 5 wherein the ends of said drive shafts project beyond said mounting block, and wherein said gear means are mounted on the projecting ends of said drive shafts.

7. A method for heat sealing tubular liners and the like to form a relatively narrow continuous line of seal, which comprises the steps of continuously advancing the liners in a straight-line path of travel between an opposing pair of elongated sealing bars positioned to contact the opposite sides of the liner only in the areas to be sealed, and moving said sealing bars in unison in paths of travel in which the sealing bars repeatedly contact the opposite sides of each advancing liner as it passes between said sealing bars, whereby to incrementally form a continuous line of seal across the area of the liner contacted by the sealing bars.

8. The method claimed in claim 7 including the step of moving the sealing bars in orbital paths of travel in which the sealing bars advance and retract in the direction of travel of the liners and concurrently move toward and away from each other.

9. The method claimed in claim 8 including the step of moving the sealing bars in their orbital paths of travel in timed relation to the movement of the liners in their path of travel.

10. The method claimed in claim 9 including the steps of advancing the sealing bars in the direction of the path of travel of the liner while moving the sealing bars toward each other so as to engage the liner therebetween, and moving the sealing bars in their said paths of travel at an effective lineal rate of speed corresponding to the lineal rate of speed at which the liners are advanced.

* * * * *